United States Patent
Ramamurthy et al.

(10) Patent No.: US 10,824,588 B2
(45) Date of Patent: Nov. 3, 2020

(54) REMOTE DOCUMENT CONVERSION AND VIEWING SYSTEMS AND METHODS

(71) Applicant: ServiceNow, Inc., Santa Clara, CA (US)

(72) Inventors: Aditya Ramamurthy, Hyderabad (IN); Rao Surapaneni, San Jose, CA (US); Raghavan Muthuraman, Hyderabad (IN); Sugandh Rakha, Hyderabad (IN); Jivanjot Kaur, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 225 days.

(21) Appl. No.: 15/651,960

(22) Filed: Jul. 17, 2017

(65) Prior Publication Data
US 2018/0322132 A1   Nov. 8, 2018

(30) Foreign Application Priority Data

May 5, 2017   (IN) .............................. 201711015993

(51) Int. Cl.
| | | |
|---|---|---|
| *H04L 29/08* | (2006.01) | |
| *G06F 16/11* | (2019.01) | |
| *H04L 29/06* | (2006.01) | |
| *G06F 16/182* | (2019.01) | |
| *G06F 16/93* | (2019.01) | |

(52) U.S. Cl.
CPC .......... *G06F 16/122* (2019.01); *G06F 16/183* (2019.01); *G06F 16/93* (2019.01); *H04L 67/06* (2013.01); *H04L 67/1097* (2013.01); *H04L 67/42* (2013.01); *H04L 69/08* (2013.01)

(58) Field of Classification Search
CPC ...... G06F 16/122; G06F 16/93; G06F 16/183; H04L 67/06
See application file for complete search history.

(56) References Cited

U.S. PATENT DOCUMENTS

| | | | |
|---|---|---|---|
| 6,678,887 B1 | 1/2004 | Hallman | |
| 7,020,706 B2 | 3/2006 | Cates | |
| 7,681,122 B1* | 3/2010 | Tsykora | ................ G06F 16/116 715/249 |
| 7,716,353 B2 | 5/2010 | Golovinsky | |
| 7,769,718 B2 | 8/2010 | Murley | |
| 7,925,981 B2 | 4/2011 | Pourheidari | |
| 8,402,127 B2 | 3/2013 | Solin | |
| 8,612,408 B2 | 12/2013 | Trinon | |

(Continued)

*Primary Examiner* — Viet D Vu
(74) *Attorney, Agent, or Firm* — Fletcher Yoder PC

(57) ABSTRACT

A network system may include a conversion server device and a computing system disposed within a remote network management platform. The computing system may be configured to: receive, from a client device of a managed network, a view request for a file that is associated with a file identifier and stored in the computing system; in response to receiving the view request, determine that the file is in a first format; based on the determining that the file is in the first format, transmit, to the conversion server device, a conversion request so that the conversion server device then converts the file from the first format into a second format that is based on a rasterized representation of the file; receive the file in the second format from the conversion server device; and transmit the file in the second format to the client device.

21 Claims, 8 Drawing Sheets

(56) References Cited

U.S. PATENT DOCUMENTS

| | | | |
|---|---|---|---|
| 8,832,652 B2 | 9/2014 | Mueller | |
| 8,983,982 B2 | 3/2015 | Rangarajan | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 2008/0195698 A1* | 8/2008 | Stefanovic | H04N 7/17327 709/203 |
| 2009/0249194 A1* | 10/2009 | Day | G06F 16/9577 715/239 |
| 2012/0328259 A1* | 12/2012 | Seibert, Jr. | G06F 17/212 386/230 |
| 2014/0253957 A1* | 9/2014 | Tye | G06F 3/122 358/1.15 |
| 2017/0006349 A1* | 1/2017 | Song | H04N 21/6125 |
| 2017/0140342 A1* | 5/2017 | Jones | G06Q 10/0631 |

\* cited by examiner

REMOTE DOCUMENT CONVERSION AND VIEWING SYSTEMS AND METHODS

CROSS-REFERENCE TO RELATED APPLICATION

This application claims priority to and the benefit of Indian Patent Application No. 201711015993, entitled "DOCUMENT VIEWER", filed May 5, 2017, which is herein incorporated by reference in its entirety.

BACKGROUND

As an enterprise employs cloud-based network(s), such as remotely hosted services managed by a third party, those cloud-based network(s) may store files that are accessible by client devices on the enterprise's network. In order to cause a client device to display contents of a file stored by a cloud-based network, the client device may undergo a relatively time consuming process that involves downloading the file from the cloud-based network onto a local folder on the client device, navigating through a file directory to that local folder, and then opening the file stored in the local folder. Assuming that the file is of a particular format, the client device may also need to have installed thereon particular software that supports display of the file in that particular format. Consequently, if the client device does not have the particular software installed thereon, the client device may not be able to display the file's contents. And even if the client device does have the particular software installed thereon, the client device may still undergo the time consuming process to display of the file's contents.

SUMMARY

It is now common for enterprise networks to employ one or more third-party cloud-based networks for application development, data storage, and service hosting. The addition of third-party cloud-based networks extends the computing and storage capabilities of the enterprise. For example, a third-party cloud-based network may remotely store many of the enterprise network's computer-readable files, and these remotely-stored files may be accessible by the enterprise network's client devices depending on access privileges, among other considerations. But even if a given client device has permission to access a file, the client device's user may only be able to view the file's contents after the above-mentioned time consuming process is complete. And if the client device does not have software that supports viewing the file, then the user might not be able to view the file's contents on that client device.

Disclosed herein is a cloud-based network system that facilitates display of remotely-stored file(s) by client device (s) of an enterprise network. The network system may include a computing system and a conversion server device disposed within a remote network management platform. The computing system may communicate with the enterprise network's client devices, so that a client device could request to display contents of a particular file remotely stored by the computing system. The conversion server device may be configured to convert files into a format supported for display by client device(s).

In practice, a client device may be able to launch an application arranged to display files in a particular format (e.g., a portable document format (PDF) viewer application launched from within a web browser on the client device). Given this, if the particular file is not in this format, the computing system may send the particular file to the conversion server device for conversion of the particular file into the appropriate format. Once the computing system receives the particular file in the appropriate format, the computing system could provide the particular file in that format to the client device for display via the application.

By remotely converting a file into a supported format, the network system may facilitate display of a file's contents via an application on a client device, even if that file is not remotely stored in a supported format. Advantageously, this could help expedite the process of causing a client device to displaying a remotely-stored file and could allow a client device to do so regardless of whether or not the client device has supporting software locally installed thereon. In this way, the disclosed network system may help an enterprise to save time, to optimize use of computing resources, and/or to reduce costs on specialized software, among other possible outcomes.

Accordingly, a first example embodiment may involve a network system including a conversion server device and a computing system disposed within a remote network management platform. The computing system may be configured to: receive a view request for a file that is associated with a file identifier and stored in the computing system, where the view request is received from a client device of a managed network, and where the remote network management platform remotely manages the managed network; in response to receiving the view request, determine that the file is in a first format; based on the determining that the file is in the first format, transmit, to the conversion server device, a conversion request that includes the file identifier and the file in the first format, where the conversion server device is configured to convert the file from the first format into a second format in response to receiving the conversion request, and where the second format is based on a rasterized representation of the file; receive the file in the second format from the conversion server device; and transmit the file in the second format to the client device.

A second example embodiment may involve receiving, by a computing system of a remote network management platform, a view request for a file that is associated with a file identifier and stored in the computing system, where the remote network management platform remotely manages a managed network, and where the view request is received from a client device of the managed network. The second example embodiment may also involve, in response to receiving the view request, determining, by the computing system, that the file is in a first format. The second example embodiment may additionally involve, based on the determining that the file is in the first format, transmitting, by the computing system to a conversion server device, a conversion request that includes the file identifier and the file in the first format, where the conversion server device is within the remote network management platform but not within the computing system, where reception of the conversion request causes the conversion server device to convert the file from the first format into a second format, and where the second format is based on a rasterized representation of the file. The second example embodiment may further involve receiving, by the computing system, the file in the second format from the conversion server device. The second example embodiment may yet further involve transmitting, by the computing system, the file in the second format to the client device.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
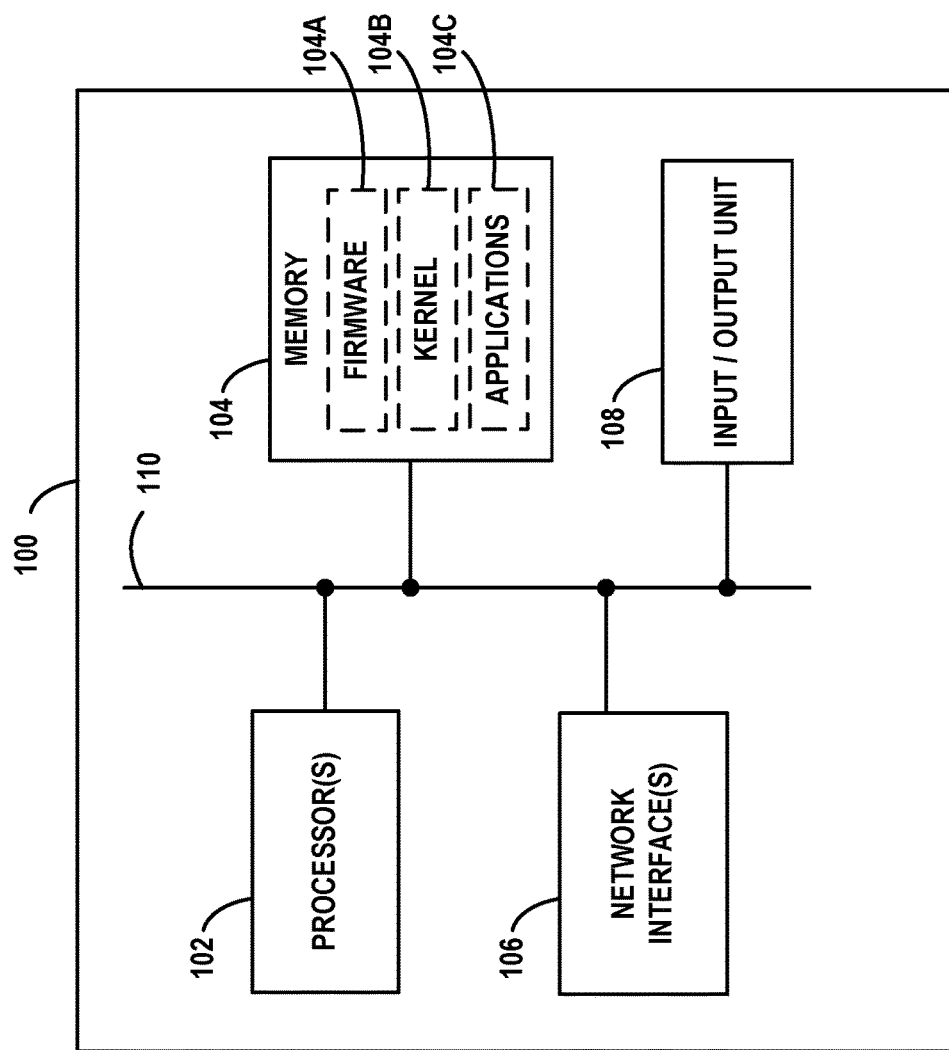
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, tem-plating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
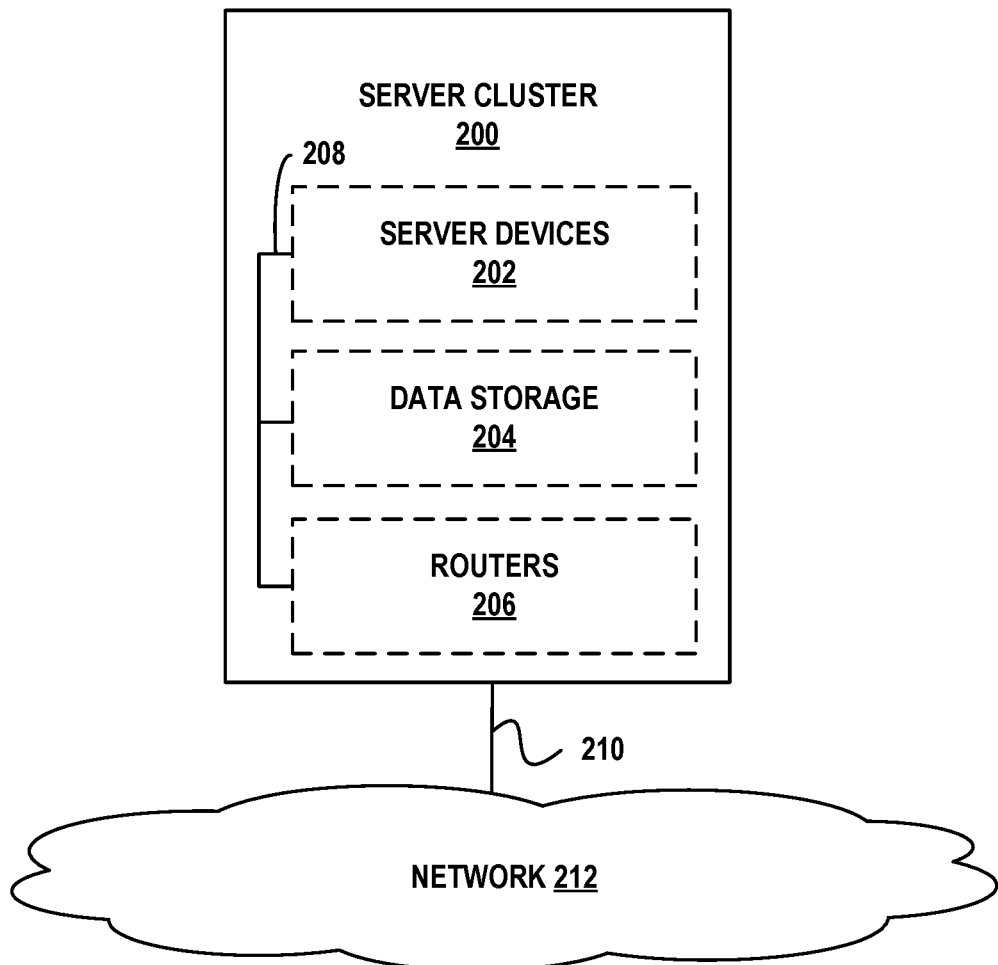
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
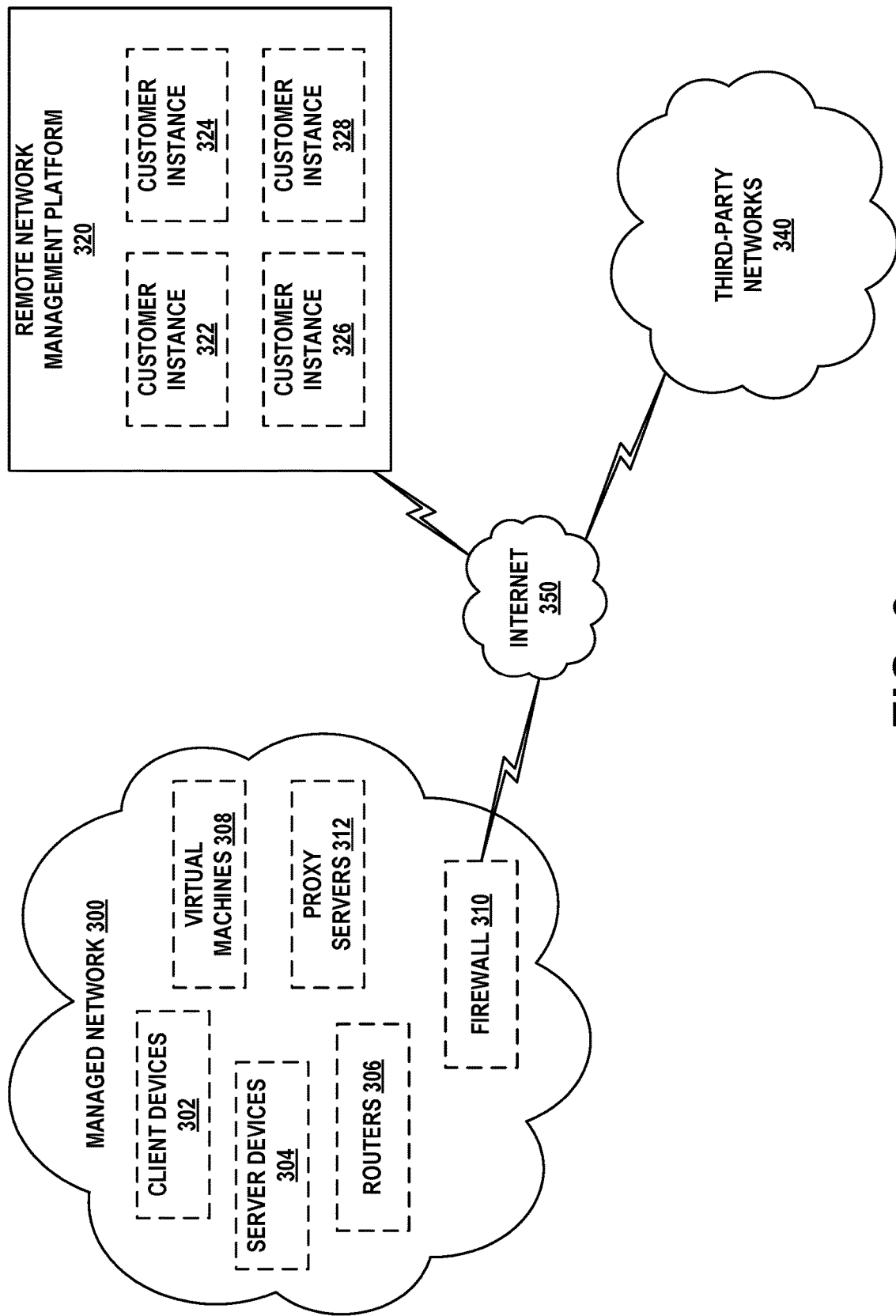
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
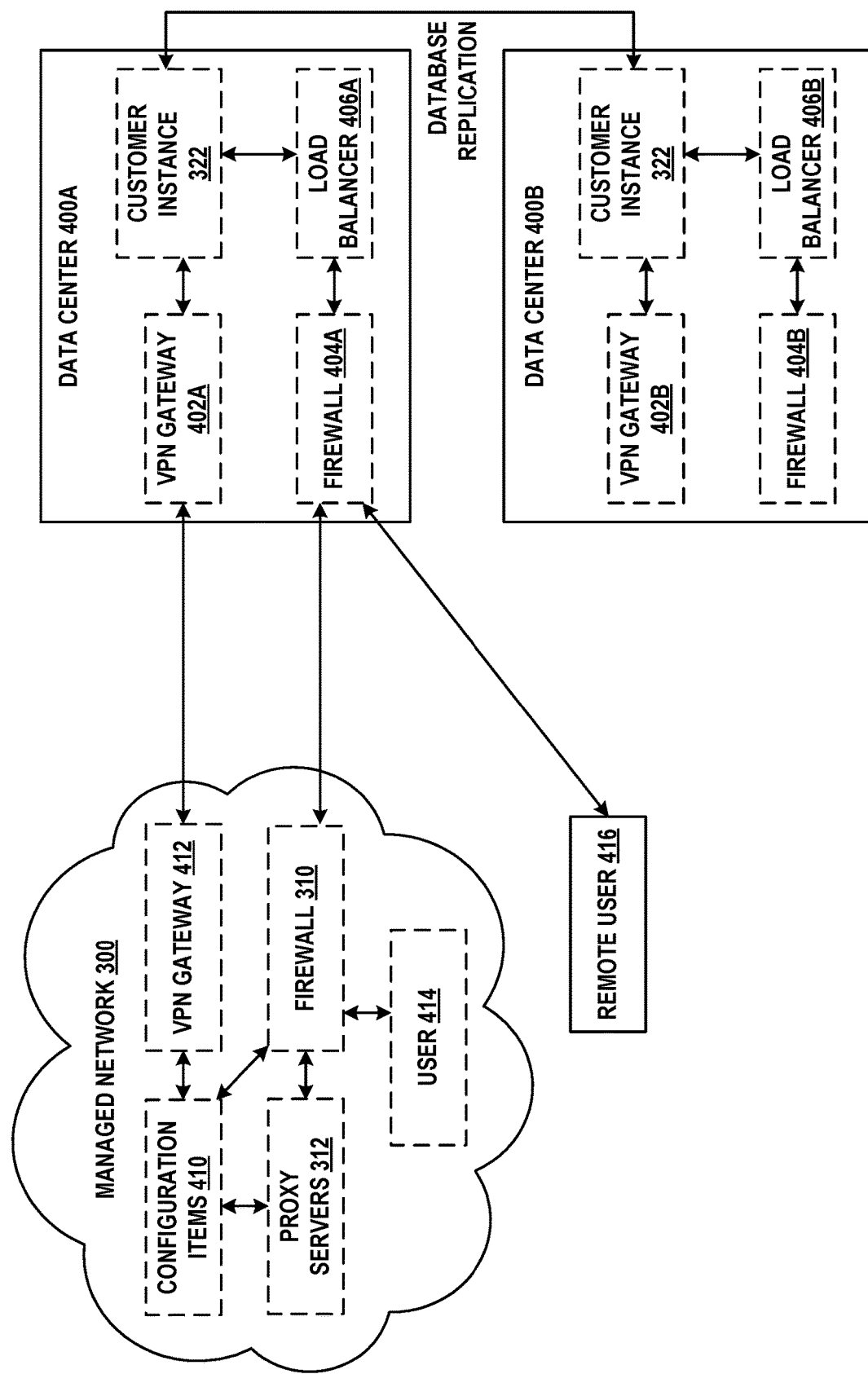
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE AND SERVICE DISCOVERY

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
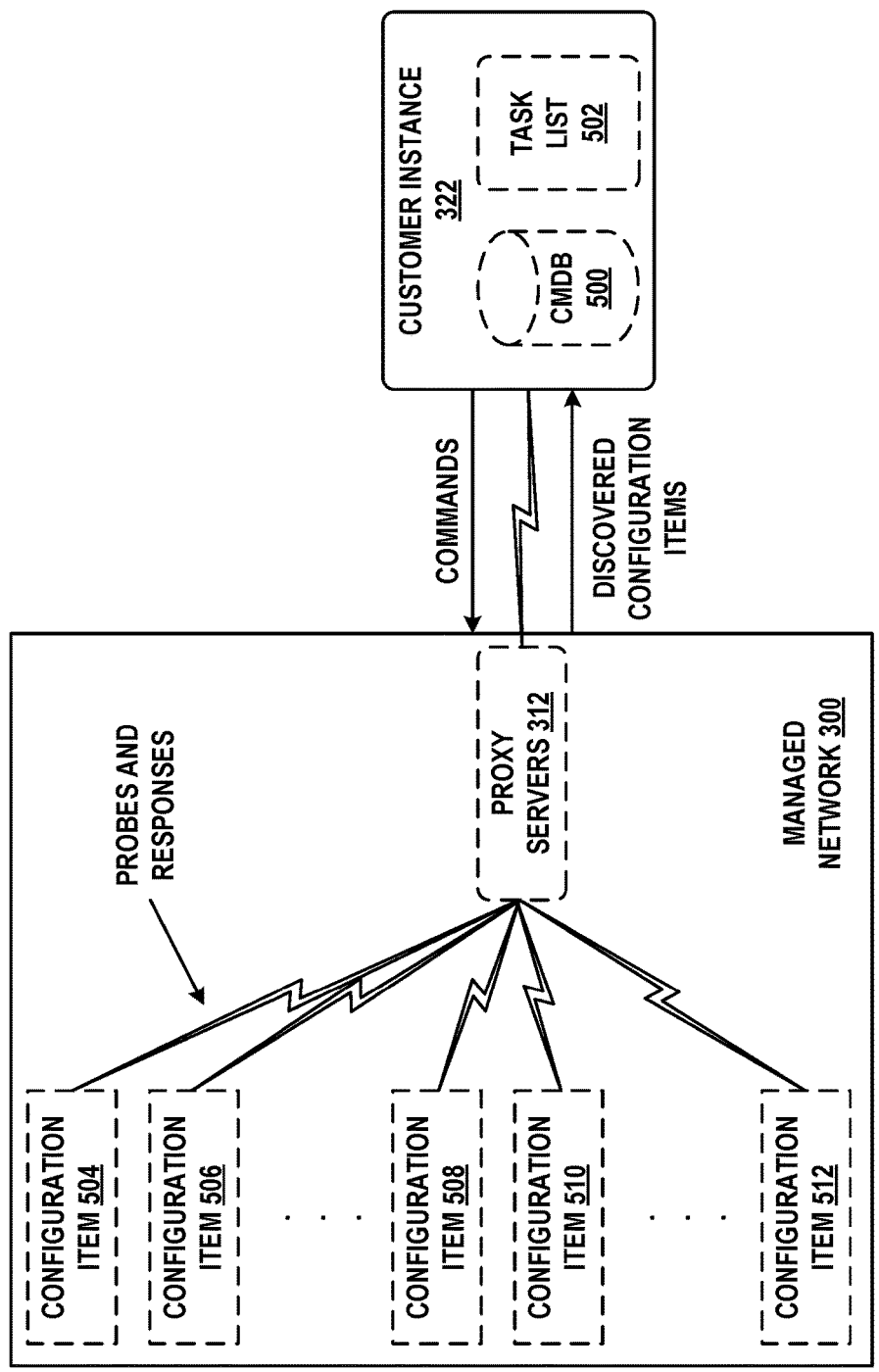
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
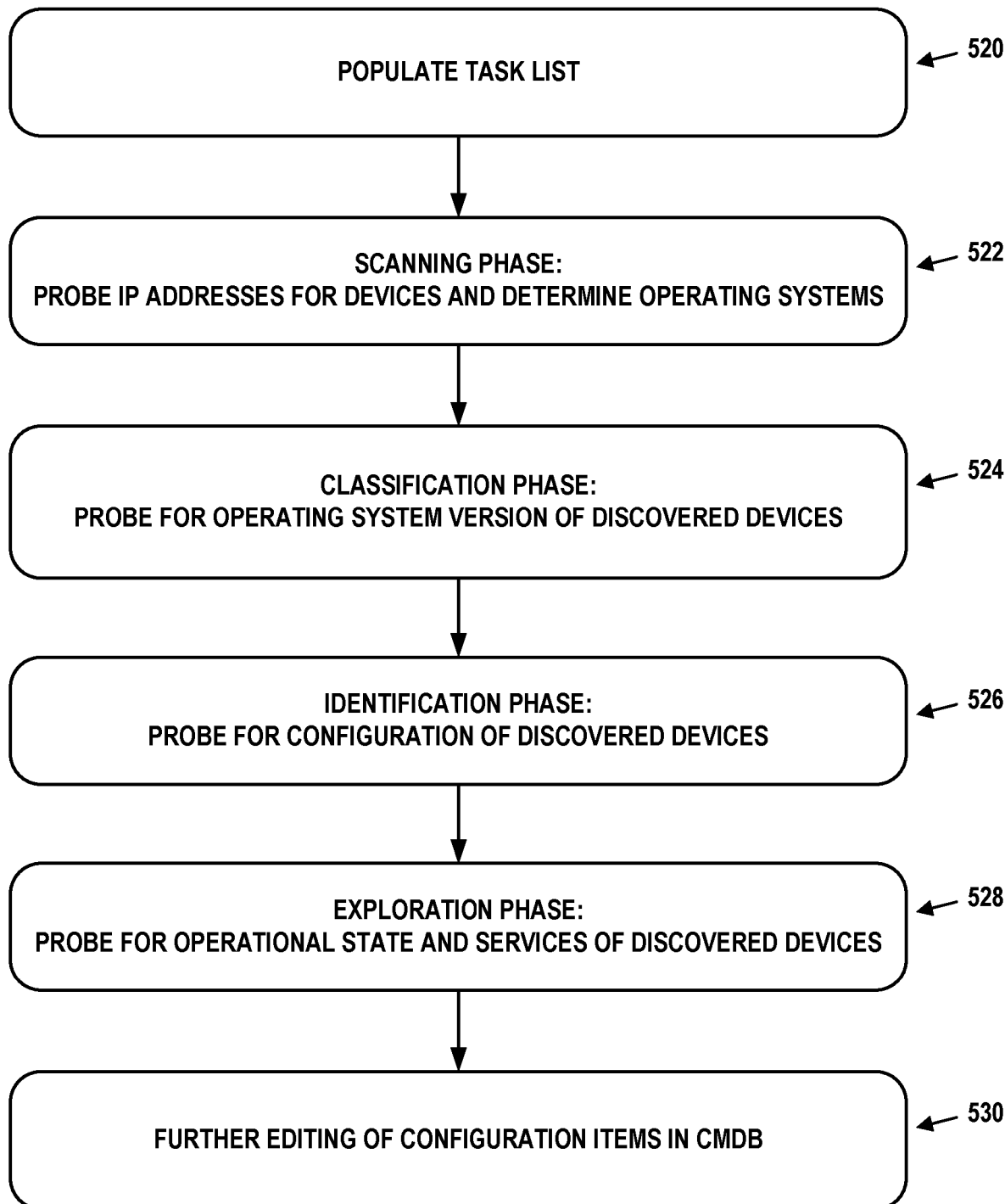
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE SYSTEM TO FACILITATE DISPLAY OF A DOCUMENT BY A CLIENT DEVICE

In line with the discussion above, disclosed herein is a network system that facilitates display of a remotely-stored file's contents via an application on a client device, even if that file is not remotely stored in a supported format. In this way, the network system could help expedite the process of causing a client device to display the remotely-stored file and could allow the client device to do so regardless of whether or not the client device has software locally installed thereon that supports the format in which the file is stored.

Figure 6A:
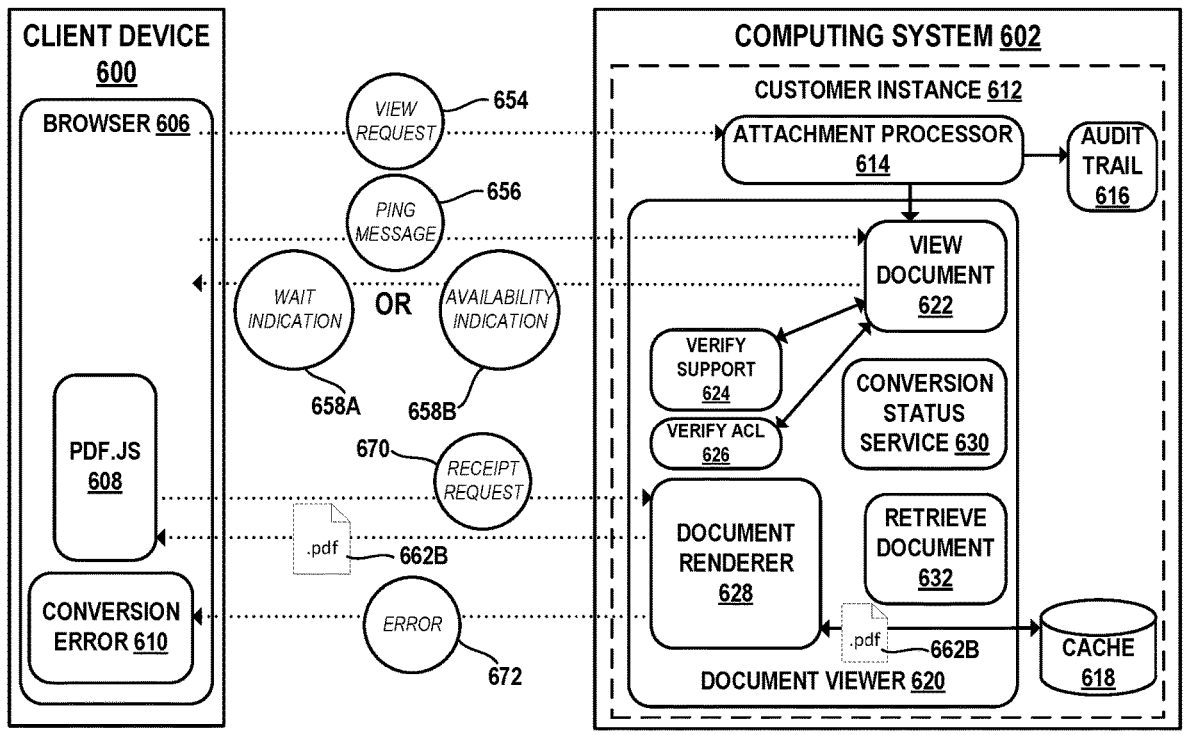
FIG. 6A depicts communications between a client device and a computing system, in accordance with example embodiments.
Figure 6B:
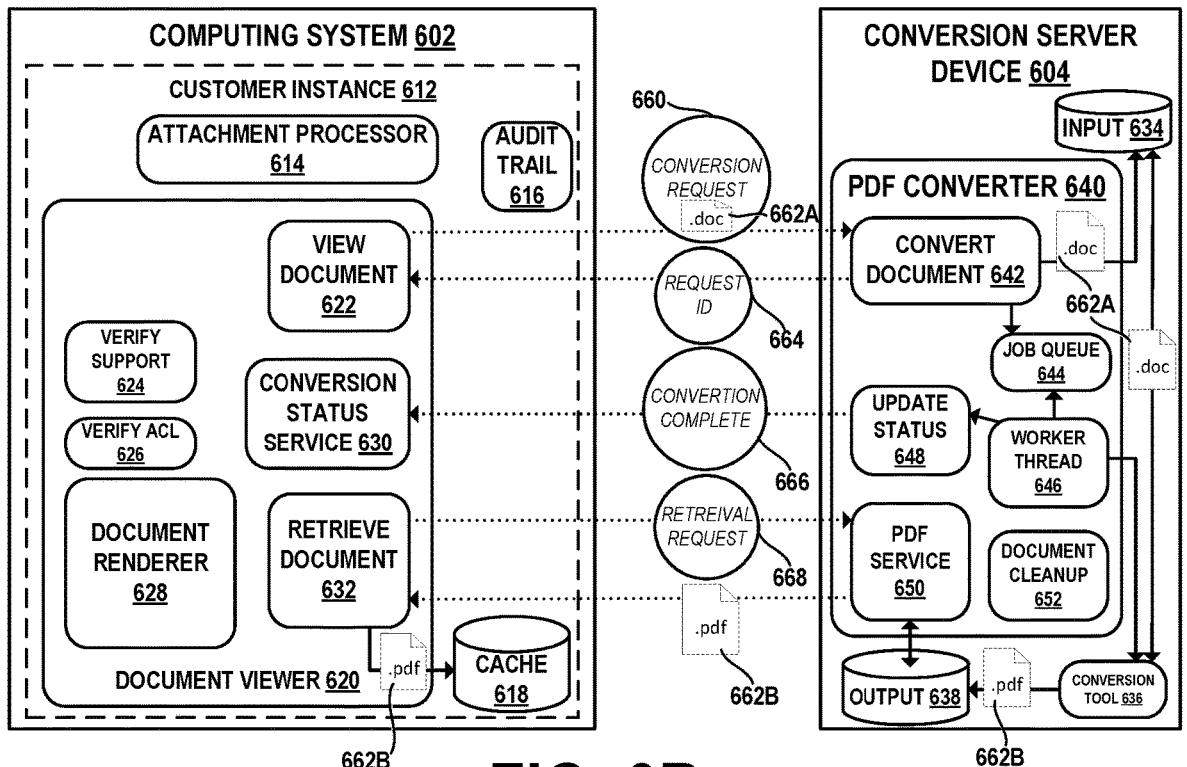
FIG. 6B depicts communications between the computing system and a conversion server device, in accordance with example embodiments.

FIGS. 6A and 6B illustrate features, components, and operations of a network system that facilitates display of a remotely-stored file by a managed network's client device. Although FIGS. 6A and 6B illustrate a specific arrangement, it should be understood that various operations disclosed herein may be carried out in the context of similar and/or other arrangement(s) as well without departing from the scope of the present disclosure. Furthermore, although the present disclosure is described in the context of a remote management network that remotely manages a managed network, it should be understood that aspects of the present disclosure may additionally or alternatively apply in other context(s) as well without departing from the scope of the present disclosure.

FIG. 6A illustrates a client device 600, which may be one of the client devices 302 on the managed network 300. As shown, the client device 600 may engage in communications with a computing system 602 of a network system, such as via wired and/or wireless communication link(s) (not shown). In practice, the computing system 602 may be disposed within a remote network management platform, such as remote network management platform 320, so as to support remote management of the client device 600's managed network.

FIG. 6B illustrates a conversion server device 604 of the network system, which may also be disposed within the remote network management platform. As shown, the conversion server device 604 and the computing system 602 may engage in communications with one another, such as via wired and/or wireless communication link(s) (not shown). In accordance with the present disclosure, the conversion server device 604 may be configured to convert a file from one of a plurality of first formats into a second format. Generally, the second format could be any feasible format that would allow client device(s) of the managed network to display contents of the file.

By way of example (and without limitation), the second format may be a rasterized format of a file. In particular, a rasterized format may be one in which pixels or points collectively represent contents of the file. Given this, conversion of a file into a rasterized format may involve a process of rasterization in which the file's contents are converted into pixels or points each respectively containing certain information, such as information about color and/or depth, among other possibilities. Advantageously, display of a file in at rasterized format may help prevent unauthorized editing the file's contents. Other examples are also possible.

More specifically, client device 600 may be configured to operate a web browser 606, which is a software application that may retrieve, present, and/or navigate through information on the World Wide Web. The browser 606 may include a web-display tool that provides for or otherwise supports display of files in the second format at issue. For example, the web-display tool may be a PDF.js 608 tool, which is a third-party library for web browser rendering of PDF files. Moreover, the browser 606 may include a conversion error 610 feature that provides the browser 606 with the capability of displaying a failure indication. As further discussed herein, the failure indication may indicate that a file conversion by conversion server device 604 has failed and/or that conversion server device 604 does not support a conversion from the file's current format into the second format, among other options.

Computing system 602 may include computing resources that enable use of a customer instance 612 as discussed herein, which may be any one of the instances of the managed network 300. Given this, the computing system 602 may provide for some or all of the web portals, services, and/or applications available to the client device 600's managed network, thereby supporting management of that managed network via customer instance 612. And in accordance with the present disclosure, the customer instance 612 may include features that facilitate display by the client device 600 of a file that is remotely-stored by the computing system 602. Specifically, the customer instance 612 may include an attachment processor 614, and audit trail 616 feature, a cache 618, and document viewer 620 functionality.

The attachment processor 614 may be configured to determine whether a request received from a client device is a view request requesting display of the file by a client device or a download request requesting to download the file onto a client device. Additionally, the attachment processor 614 may be configured to carry out subsequent operations based on the type of request that was received, such as by communicating with certain feature(s) of the instance 612 (e.g., document viewer 620) responsive to a view request and communicating with other feature(s) of the instance 612 responsive to a download request.

The audit trail 616 feature may be configured to maintain a count of view requests received for a given file and/or a count of download requests received for the given file. Specifically, when the attachment processor 614 receives a view request for the given file, the attachment processor 614 may inform the audit trail 616 feature of this view request, and the audit trail 616 feature may responsively increment a view count associated with view requests for that given file, such as in association with a file identifier of that given file. Similarly, when the attachment processor 614 receives a download request for the given file, the attachment processor 614 may inform the audit trail 616 feature of this download request, and the audit trail 616 feature may responsively increment a download count associated with download requests for that given file, such as in association with the file identifier.

The cache 618 may serve as data storage of file(s) that are in the second format. In some cases, a file in the cache 618 may be a file that was already in the second format when originally stored on the computing system 602 and thus was not necessarily converted into that second format by the conversion server device 604. In other cases, however, a file in the cache 618 may be a file that is stored in the cache 618 after that file is converted into the second format, as further described herein.

The document viewer 620 functionality may include features that manage or otherwise prepare a file for transmission in the second format to a client device for display. As shown, the document viewer 620 functionality may include a view document 622 controller, a verify support 624 feature, a verify Access Control List (ACL) 626 feature, a document renderer 628 feature, a conversion status service 630, and a retrieve document 632 feature.

The view document 622 controller may initiate operations in response to being informed by the attachment processor 614 that a view request has been received for a file. These operations may be within the document viewer 620 and/or may involve communication with the conversion server device 604, among other options.

For example, the view document 622 controller may engage in communications with the verify support 624 feature. The verify support 624 feature may be configured to determine format of a file for which a view request was received, such as by reading a file extension of the file, among other options. Also, the verify support 624 feature may be configured to determine whether or not the conversion server device 604 supports conversion of a file from a determined format to the second format, such as by referring to a list of formats supported for conversion. Thus, the view document 622 controller may query the verify support 624 feature to determine format of a file. If the view document 622 controller determines that the file's format is not the second format, the view document 622 controller may responsively determine that the file should be converted into the second format. In this case, the view document 622 may query the verify support 624 feature to determine whether or not the conversion server device 604 supports conversion of the file.

In another example, the view document 622 controller may engage in communications with the verify ACL 626 feature. The verify ACL 626 feature may be configured to provide a list of permissions respectively for each of a plurality of files stored by the computing system 602. Thus, the view document 622 controller may query the verify ACL

626 feature to determine whether or not a particular user-account and/or client device on the managed network 300 is permitted to display and/or download a given file. In an example implementation, the view ACL 626 feature may verify permissions based on a group identifier associated with the managed network 300 (e.g., permit display and/or download if a user-account has an associate e-mail address ending with "@companyname.com"). Other implementations are possible as well.

In yet another example, the view document 622 controller may be configured to transmit a conversion request to the conversion server device 604. Generally, the view document 622 controller may do so in response to a determination that a file is not in the second format and thus that the file should be converted into the second format. Moreover, the view document 622 controller may transmit a conversion request in response to a determination that the conversion server device 604 supports conversion of the file and/or in response to a determination that a client device providing a view request for the file is permitted to display the file. Other examples are possible as well.

As noted, the document viewer 620 functionality may also include a document renderer 628 feature, a conversion status service 630, and a retrieve document 632 feature. The document renderer 628 feature may be configured to transmit the file in the second format to the client device that provided a view request for that file, the conversion status service 630 may be configured to determine a status of conversion of a file into the second format by the conversion server device 604, and the retrieve document 632 feature may be configured to obtain, from the conversion server device 604, a file that has been converted into the second format and to store the obtained document in the cache 618.

Conversion server device 604 may include computing resources that coordinate and facilitate conversion of a file from a first format to a second format. For example, the first format may be a format supported by a word processing application, a presentation application, or a spreadsheet application, among other options. And the second format may be a PDF, in line with the discussion above. But the second format may additionally or alternatively be any other viewable format. Furthermore, in practice, the conversion server device 604 may or may not be associated with or otherwise be a part of customer instance 612. Regardless, as shown, the conversion server device 604 may include an input folder 634, a conversion tool 636, an output folder 638, and PDF converter 640 functionality.

The input folder 634 may serve as data storage in which the conversion server device 604 stores file(s) in the first format before those file(s) are converted into the second format. The output folder 638 may serve as data storage in which the conversion server device 604 stores file(s) in the second format after those file(s) are converted.

The conversion tool 636 may be configured to obtain a file from the input folder 634, to convert the obtained file into the second format, and to store the converted file in the output folder 638. In practice, the conversion tool 636 may be any currently available and/or future developed software configured to convert a file from one format to another format.

The PDF converter 640 functionality may manage conversion of a file based on a conversion request received from the computing system 602. As shown, the PDF converter 640 functionality may include a convert document 642 controller, a job queue 644 feature, a worker thread 646 controller, an update status 648 feature, a PDF service 650 feature, and a document cleanup 652 feature.

The convert document 642 controller may be configured to initiate operations within the conversion server device 604 in response to receiving a conversion request for a file, which may include the file for which a conversion is requested. For example, the convert document 642 controller may store the received file in the input folder 634 along with a conversion request identifier generated by that controller. In another example, the convert document 642 controller may create new file conversion jobs in the job queue 644 feature.

The job queue 644 feature may include a listing of pending file conversion(s) that have been requested by the computing system 602 and/or other computing system 602, which may include file conversion(s) that are yet to be executed by the conversion tool 636 and/or file conversion(s) that are in-progress, among other possibilities. Given this, the convert document 642 controller could create, based on a received conversion request, a new file conversion job in the job queue 644, which may include the request identifier.

The worker thread 646 controller may be configured to manage file conversion jobs listed in the job queue 644. For instance, the worker thread 646 controller may inform the conversion tool 636 of a file conversion that should be carried out, such as by providing a request identifier to the conversion tool 636. In this way, the conversion tool 636 may responsively obtain the file associated with the request identifier from the input folder 634 and then carry out conversion of that file.

Additionally or alternatively, the worker thread 646 controller may determine a status of a given file conversion job, so that the worker thread 646 controller can inform the update status 648 feature of that status. In this way, the update status 648 feature could then maintain a status for one or more file conversion jobs.

To facilitate determination of a status, the worker thread 646 controller may refer to the job queue 644 and/or may query the conversion tool 636, among other possibilities. For example, if the worker thread 646 controller determines that a given file conversion job is listed in the job queue 644, then the worker thread 646 controller may responsively determine that the file conversion job is pending. In another example, if the worker thread 646 controller determines that a given file conversion job is being executed by the conversion tool 636, then the worker thread 646 controller may responsively determine that the file conversion job is in-progress. In yet another example, if the worker thread 646 controller determines that a given file conversion job is no longer in the job queue 644 and is no longer being executed by the conversion tool 636, then the worker thread 646 controller may responsively determine that the file conversion job is complete. Other examples are possible as well.

The PDF service 650 feature may be configured to obtain a file in the second format from the output folder 638 in response to receiving a retrieval request for that file, so that the conversion server device 604 could then provide that file to the computing system 602.

The document cleanup 652 feature may be configured to delete file(s) stored in the input folder 634 and/or in the output folder 638. In one case, the document cleanup 652 feature may delete file(s) from time-to-time, such as based on a predefined schedule. In another case, the document cleanup 652 feature may delete a particular stored file or all stored files in response to a request for deleting those file(s). In yet another case, the document cleanup 652 feature may delete a particular file in response to a determination that the particular file has been stored by the conversion server device 604 for at least a threshold time period. In any case, deletion of a file may help decrease a probability of an unauthorized entity gaining access to that file via the conversion server device 604. Other cases are possible as well.

In a system arranged as described above, the computing system 602 may respectively engage in communications with the client device 600 and with the conversion server device 604. In practice, these communications may trigger one or more operations by respective features/components of the client device 600, the computing system 602, and/or the conversion server device 604, such as operations described above with reference to FIGS. 6A and 6B, among others. Moreover, although particular communications are described in a particular order, it should be understood that these communications could be carried out in any feasible order, that one or more of these communications could be eliminated, and that one or more other communication could also be carried out to facilitate aspects of the present disclosure.

More specifically, the computing system 602 may receive, from the client device 600, a view request 654 for a file stored in the computing system 602. Generally, the client device 600 may transmit the view request 654 in response to receiving input data (e.g., provided by a user) selecting display of the file's contents by the client device 600. For example, the input data may be received via the browser 606 and the browser may responsively transmit the view request 654 to the attachment processor 614 as shown by FIG. 6A.

In an example implementation, the view request 654 may include a file identifier associated with the file, so as to indicate to the computing system 602 which file the client device 600 is requesting to display. In practice, one or both of the client device 600 and the computing system 602 may have stored thereon or may otherwise have access to mapping data that maps each of a plurality of files respectively to a file identifier. Given this, the client device 600 could refer to the mapping data to determine the file identifier to include in the view request 654, and the computing system 602 could then refer to the mapping data to determine the file associated with the file identifier included in the view request 654.

After the computing system 602 receives the view request 654, the computing system 602 may receive from time-to-time (e.g., periodically) a ping message 656 in association with the view request 654. The ping message 656 may inquire about availability of the file in the second format, so as to determine whether the client device 600 should proceed with obtaining the file in the second format from the computing system 602 or whether the client device 600 should continue to wait for the file to be available in the second format. In practice, the ping message 656 may include the file identifier so as to indicate to the computing system 602 which file the client device 600 is inquiring about.

In response to receiving a ping message 656 from the client device 600, the computing system 602 may transmit a status to the client device 600. The status may indicate to the client device 600 whether or not the file is available in the second format. For instance, the computing system 602 may transmit to the client device 600 a wait indication 658A indicating that the file is not yet available in the second format, or an availability indication 658B indicating that the file is available in the second format. In practice, a wait indication 658A and/or an availability indication 658B may include the file identifier so as to indicate to the client device 600 the file for which the status is being provided. Nonetheless, the computing system 602 may determine and provide the status in one of various ways.

For example, FIG. 6A illustrates that the view document 622 controller receives the ping message 656 from the browser 606 and responds to the ping message 656 with either a wait indication 658A or with an availability indication 658B. In this example, the view document 622 controller may determine the status by querying the conversion status service 630, which may be configured to determine a status of conversion of a file into the second format as noted above and further described herein. Additionally or alternatively, the view document 622 controller may determine the status by determining whether or not the file at issue is stored in the second format at the cache 618. In practice, the view document 622 controller could do so regardless of whether the file at issue was converted by the conversion server device 604 or whether the file was already in the second format when stored at the computing system 602. Other examples are also possible.

Further, after the computing system 602 receives the view request 654, the computing system 602 may determine whether the file is already in the second format or whether the file is in a first format. In practice, the computing system 602 may determine the format of the file in various ways. For example, as noted above, the view document 622 controller may determine the format of the file by querying the verify support 624 feature. In another example, the computing system 602 may refer to the cache 618 to determine whether the file is already stored in the cache 618 and, if the computing system 602 determines that the file is already stored in the cache 618, then the computing system 602 may responsively determine that the file is already in the second format. Other examples are possible as well.

Once the computing system determines the format of the file, the computing system 602 may perform subsequent operations based on the determined format of the file. In particular, if the computing system 602 determines that the file is already in the second format, then the computing system 602 may subsequently transmit an availability indication 658B in response to a ping message 656, so that the client device 600 could then obtain the file in the second format as further discussed herein. But if the computing system 602 determines that the file in a first format and thus not already in the second format, then the computing system 602 may responsively determine that the file at issue should be converted to the second format by the conversion server device 604.

In this latter situation, before triggering conversion of the file, the computing system 602 may first verify that the client device 600 is permitted to display the file and/or that the conversion server device 604 supports this conversion. For example, as noted, the computing system 602 may do so by having the view document 622 controller query the verify ACL 626 feature and/or the verify support 624 feature. Other examples are also possible.

When the computing system 602 determines that the file should be converted to the second format by the conversion server device 604, the computing system 602 may responsively transmit, to the conversion server device 604, a conversion request 660 for the file associated with the view request 654. The conversion request 660 may be a request for the conversion server device 604 to convert the file from the first format into the second format. Thus, the conversion request 660 may include at least the file identifier and the file in the first format. By way of example, FIG. 6B illustrates that the conversion request 660 includes the file in a first format 662A corresponding to a format supported by a word processing application (e.g., ".doc"). Other examples are also possible.

In response to receiving the conversion request 660, the conversion server device 604 may then carry out conversion of the file. For example, in line with the discussion above, the convert document 642 controller may respond to the conversion request 660 by storing the received file in the first format 662A in the input folder 634 and by creating a new file conversion job for the conversion request 660 in the job queue 644 feature. In this way, the worker thread 646 controller may ultimately trigger the conversion by the conversion tool 636, so that the conversion tool 636 obtains the file in the second format 662A from the input folder 634 and then carries out conversion of that file. As shown by FIG. 6B, once the conversion tool 636 completes the conversion of the file, the conversion tool 636 may output the file in the second format 662B (e.g., ".pdf") to the output folder 638. Other examples are possible as well.

Furthermore, when the conversion server device 604 receives the conversion request 660, the conversion server device 604 may transmit, to the computing system 602, a request identifier 664. For example, the convert document 642 controller may generate the request identifier 664, and transmit the generated request identifier 664 to the view document 622 controller. Generally, the request identifier 664 may refer to conversion of the file from the first format 662A to the second format 662B. And the conversion server device 604 may transmit the request identifier 664 so that the computing system 602 can use the request identifier 664 when inquiring about the conversion at issue.

After transmitting the request identifier 664 and after the conversion is complete, the conversion server device 604 may transmit, to the computing system 602, a conversion complete message 666. For example, in line with the discussion above, the update status 648 feature could maintain a status of the file conversion job arranged for the file associated with the view request 654 and, assuming that the conversion is complete, may transmit the conversion complete message 666 to the conversion status service 630. Generally, the conversion complete message 666 may indicate that conversion of the file from the first format 662A to the second format 662B is complete. Moreover, the conversion complete message 666 may include the file identifier and/or the request identifier 664 so as to indicate the particular file and/or particular file conversion job being referred to in the conversion complete message 666. In this way, in response to receiving the conversion complete message 666, the computing system 602 (e.g., the conversion status service 630) could determine that the conversion of the file at issue is complete.

When the computing system 602 receives the conversion complete message 666, the computing system 602 may responsively transmit, to the conversion server device 604, a file retrieval request 668, so as to obtain the file in the second format 662B from the conversion server device 604. In practice, the file retrieval request 668 may include the file identifier and/or the request identifier 664 so as to indicate that the file associated with the view request 654 is the file that the computing system 602 is requesting to receive. And as a security measure, the conversion server device 604 may transmit the file at issue to the computing system 602 if the conversion server device 604 can verify that the file identifier and the request identifier 664 are both associated with the same file for which a conversion was requested.

In some implementations, the conversion server device 604 could carry out additionally or alternatively carry out security measure that involves inclusion of a secure identifier for further verification purposes. In particular, the file retrieval request 668 may additionally or alternatively include a secure identifier based on which the conversion server device 604 could verify that the computing system 602, or more particularly customer instance 612, is permitted to retrieve the file at issue from the conversion server device 604. In such implementations, the secure identifier may take one of various forms.

In one case, the secure identifier may be a randomly generated bitstring, such as a security token for example, which may be cryptographically generated by the computing system 602 (e.g., by view document 622 controller). In practice, the computing system 602 may include the randomly generated bitstring in the conversion request 660 so that the conversion server device 604 could later verify that a computing system requesting to retrieve the file is permitted to do so. As such, the computing system 602 may include the randomly generated bitstring in the file retrieval request 668, and the conversion server device 604 may then verify that the randomly generated bitstring included in the file retrieval request 668 is identical to the randomly generated bitstring originally included in the conversion request 660. In this case, the conversion server device 604 may transmit the file at issue to the computing system 602 if the conversion server device 604 verifies that the randomly generated bitstrings are identical.

In another case, the secure identifier may be a browser cookie associated with the browser 606. In practice, the client device 600 may include the browser cookie in the view request 654 and the computing system 602 may include that same browser cookie in the conversion request 660 so that the conversion server device 604 could later verify that a computing system requesting to retrieve the file is permitted to do so. As such, the computing system 602 may include the browser cookie in the file retrieval request 668, and the conversion server device 604 may then verify that the browser cookie included in the file retrieval request 668 is identical to the browser cookie originally included in the conversion request 660. In this case, the conversion server device 604 may transmit the file at issue to the computing system 602 if the conversion server device 604 verifies that the browser cookies are identical. Moreover, by using a browser cookie rather than a randomly generated bitstring, the network system may be able to avoid the step of having to cryptographically generate the randomly generated bitstring, thereby saving time and/or resources. Other cases are possible as well.

In a further aspect, the network system may use a load balancer, such as load balancer 406A, to forward or otherwise route the file retrieval request 668 to the correct conversion server device. In particular, the network system may include a plurality of conversion server devices, such as the conversion server device 604. And the load balancer may be configured to distribute data traffic across those conversion server devices. With this arrangement, the computing system 602 could transmit the file retrieval request 668 by way of the load balancer, and the load balancer may then determine the conversion server device to which to forward or otherwise route the file retrieval request 668.

To facilitate this, the load balancer may, for example, add a conversion server identifier to the conversion complete message 666 before the computing system 602 receives that conversion complete message 666. The conversion server identifier may indicate that the conversion server device 604 is the conversion server device from which the computing system 602 could obtain the file in the second format 662B.

In this example, when the computing system 602 then transmits the file retrieval request 668 to the load balancer, the computing system may include the conversion server identifier in the file retrieval request 668. In this way, the load balancer may use the conversion server identifier as basis for determining that the file retrieval request 668 should be forwarded or otherwise routed to the conversion server device 604 rather than to another conversion server device, and the load balancer may forward/route the file retrieval request 668 accordingly. Other aspects and examples are also possible.

As noted above, once the conversion server device 604 receives the file retrieval request 668, the conversion server device 604 may responsively transmit the file in the second format 662B to the computing system 602. For example, FIG. 6B illustrates that the PDF service 650 feature may obtain the file in the second format 662B from the output folder 638 and may then transmit the file in the second format 662B to the retrieve document 632 feature of the computing system 602.

In this regard, when the file in the second format 662B is transmitted to the computing system 602, an instance identifier could be used to help route that file from the conversion server device 604 to the appropriate customer instance. For example, when the computing system 602 transmits the conversion request 660 and/or when the computing system 602 transmits the retrieval request 668, the computing system 602 may include in one or both of these requests an instance identifier. That instance identifier may uniquely identify the customer instance 612 through which the computing system 602 supports the client device 600's managed network (e.g., all customer instances may have different instance identifiers). In this way, the conversion server device 604 could then transmit the file in the second format 662B along with the instance identifier by way of a load balancer, and the load balancer may then use the instance identifier as basis to determine the computing system to which to forward or otherwise route the file in the second format 662B. Other examples are also possible.

Once the computing system 602 receives the file in the second format 662B, the computing system 602 may store the file in the second format 662B. For example, FIG. 6B illustrates that, once the retrieve document 632 feature receives the file in the second format 662B, the retrieve document 632 feature may responsively store the file in the second format 662B at the cache 618.

Moreover, when storing the file in the second format 662B, the computing system 602 may do so in association with the client device 600's managed network. For example, the computing system 602 may store the file along with an instance identifier that uniquely identifies the customer instance 612 through which the computing system 602 supports the client device 600's managed network. The computing system 602 could then use the instance identifier at a future point in time as basis for determining that the converted file at issue is remotely stored for the client device 600's managed network. With this approach, if the computing system 602 then receives another view request for the file from the client device 600 or from another client device of the managed network, the computing system 602 could transmit, to the client device, an indication that the file has already been previously converted and stored at the requesting client device's managed network, and thus that the previously-converted file is accessible via that managed network. Alternatively, once the requesting client device receives an indication that the file has already been previously converted, this client device could responsively transmit, to the computing system 602, a receipt request for the file, and, responsive to receiving that request, the computing system 602 could then transmit the previously-converted file to the requesting client device.

In particular, at a future point in time, the computing system 602 may receive another view request for the file from a client device of the managed network. After receiving that other view request, the computing system 602 may make a determination that file is already stored in the second format in association with the managed network and that the requesting client device is of that managed network. Responsive to the determination, the computing system 602 may transmit the stored file to the requesting client device. Other approaches are also possible.

In this regard, client device(s) of the managed network could additionally or alternative obtain the file for display through customer instance(s) other than customer instance 612. For example, a client device may engage in communication with another computing system (e.g., other than computing system 602), which may include computing resources that enable use of another customer instance (e.g., other than customer instance 612). In this example, the other computing system may receive a view request for the file from the client device of the managed network. After receiving that view request, the other computing system may make a determination that file is already stored in the second format at computing system 602 in association with the managed network and that the requesting client device is of that managed network. Responsive to the determination, the other computing system may obtain the stored file from computing system 602 and may transmit the file to the requesting device. Moreover, the computing system could store the obtained file. Other examples are also possible.

Once the file is available in the second format 662B and the client device 600 receives an availability indication 658B as discussed above, the client device 600 may respond to the availability indication 658B by obtaining the file in the second format 662B from the computing system 602. In particular, the client device 600 may transmit to the computing system 602 a receipt request 670, which is a request to receive the file in the second format 662B. In practice, the receipt request 670 could include the file identifier so as indicate to the computing system 602 which file the client device 600 is requesting. And in response to receiving the receipt request 670 including the file identifier, the computing system 602 may transmit the file in the second format 662B to the client device 600.

By way of example, FIG. 6A illustrates that the PDFjs 608 tool may transmit the receipt request 670 to the document renderer 628 feature. In response to receive the receipt request 670, the document renderer 628 feature may obtain the stored file in the second format 662B from the cache 618 and may then transmit that file in the second format 662B to the client device 600. Other examples are also possible.

In some implementations, the computing system 602 may secure the file in the second format 662B upon obtaining the file from the conversions server device 604 or at least before transmitting the file to the client device 600. By securing the file, the computing system may help prevent unauthorized access to the file, such as in a situation in which the file is obtained by an unauthorized party during transmission and/or storage of the file. Generally, the step of securing the file could take one of various forms.

By way of example, the client device 600 and the computing system 602 may establish a secure communication session with a session key (e.g., prior to the computing system 602 receiving the view request 654). The security key may serve as a tool that allows the client device 600 and the computing system 602 to respectively encrypt and/or decrypt communication(s) transmitted to one another. With this arrangement, the computing system 602 may generate a security feature for the file in the second format 662B, which may restrict access to contents of the file. In doing so, the computing system 602 may also generate an encrypted version of a security key that enables access to the file's contents. So in this example, when transmitting the file to the client device 600, the computing system 602 may transmit the file having the security feature and may also transmit the encrypted version of the security key. Given that the secure communication session has been established, the client device 600 could use the session key to decrypt the encrypted version of the security key. In this way, the client device 600 can then access the file's contents using the security key. Other examples are also possible.

When the client device 600 ultimately receives the file in the second format 662B and is able to access contents of the file, the client device 600 may launch an application arranged to display file in the second format, so as to then display the received file via that application. For example, the client device 600's browser 606 may utilize the PDFjs 608 tool to display the file in the second format 662B, which may be a PDF as noted above. Moreover, in some implementations, the computing system 602 may make the file at issue available at a Uniform Resource Locator (URL) and the browser 606 could display the file by navigating to that URL. Other implementations are possible as well.

VI. ADDITIONAL FEATURES

A. Conversion Error

In a further aspect, the computing system 602 may inform the client device 600 when the computing system 602 determines that there is an error related to conversion of the file associated with the view request 654. Generally, the computing system 602 may determine the error in response to receiving an indication from the conversion server device 604 that conversion of the file has failed and/or in response to determining that the conversion server device 604 does not support the conversion, among other options. When determining such an error, the computing system 602 may responsively transmit to the client device 602 an error message 672 indicating the determined error. For example, FIG. 6A illustrates that the document renderer 628 feature may transmit the error message 672 to the conversion error 610 feature.

Once the client device 600 receives the error message 672, the client device 600 may responsively display a failure indication, such as via the conversion error 610 feature. As noted, the failure indication may indicate that a file conversion by the conversion server device 604 has failed and/or that the conversion server device 604 does not support a conversion from the file's current format into the second format, among other options.

Moreover, in some implementations, the failure indication could include a prompt to instead download the file in the first format 662A. And if the client device 600 receives input data responding to the prompt with a download request, the client device 600 may then responsively download the file in the first format 662A from the computing system 602. In a different implementation, however, the client device 600 may respond to receipt of the error message 672 by automatically downloading the file in the first format 662A from the computing system 602, such as in addition to or instead of display of the failure indications. Other implementations are possible as well.

B. File Download

The client device 600 may download the file from the computing system. In one situation, as discussed, the client device 600 may do so following a conversion error. In another situation, however, the client device 600 may transmit a download request to the computing system 602, such as instead of or in addition to transmission of the view request 654. Specifically, the download request may be a request to download the file from the computing system 602 onto the client device 602, so that the file is then locally stored at the client device 602.

Generally, the download request may be a request for the file in the first format 662A or may be a request for the file in the second format 662B. In either case, before proceeding with transmission of the file for download, the computing system 602 may first verify that the client device 600 is permitted to download the file in the requested format, and may transmit the file for download in response to such verification. In practice, the computing system 602 could carry out such verification by referring to the verify ACL 626 feature, among other options.

Moreover, in the situation that the request format is the second format 662, the computing system 602 could determine whether the file is already available in the second format 662B and, if the determination is that the file is not available in the second format 662B, the computing system 602 may trigger the above-described conversion (assuming that the conversion server device 604 supports the conversion). In this situation, the computing system 602 may transmit the file to the client device 600 for download once the file is available in the second format 662B. Other situations are possible as well.

C. Auditing Feature

In yet a further aspect, the computing system 602 may be configured to keep track of the number of view requests received for a file as well as the number of download requests received for that same file. As noted, the computing system 602 may utilize the audit trail 616 feature to track views and downloads in this manner. With this arrangement, the computing system 602 could provide an authorized device on the managed network (e.g., client device 600) with information related to the number of views and/or downloads for a particular file. In practice, the computing system 602 may provide such information from time-to-time and/or upon request, among other possibilities.

Moreover, the computing system 602 may be configured to further categorize download requests based on a format in which the file is requested for download. For example, if the audit trail 616 feature is informed of a download request for a file in the first format, the audit trail 616 feature may responsively increment a first download count associated with download requests for that file in the first format. And if the audit trail 616 feature is informed of a download request for the file in the second format, the audit trail 616 feature may responsively increment a second download count associated with download requests for that file in the second format. Other examples are also possible.

Furthermore, the computing system 602 may be configured to keep track of success and/or failure of downloads and/or views. For example, if the audit trail 616 feature is informed of a failure to display a file (e.g., due to a failed conversion) following a view request for that file, the audit trail 616 feature may responsively increment a view failure count associated with view requests for that file. But if the audit trail 616 feature is informed of successful display of a file following a view request for that file, the audit trail 616 feature may responsively increment a view success count associated with view requests for that file. Similarly, if the audit trail 616 feature is informed of failure to download a file following a download request for that file, the audit trail 616 feature may responsively increment a download failure count associated with download requests for that file. But if the audit trail 616 feature is informed of a successful download of a file following a download request for that file, the audit trail 616 feature may responsively increment a download success count associated with download requests for that file. Other examples are also possible.

VII. EXAMPLE OPERATIONS

Figure 7:
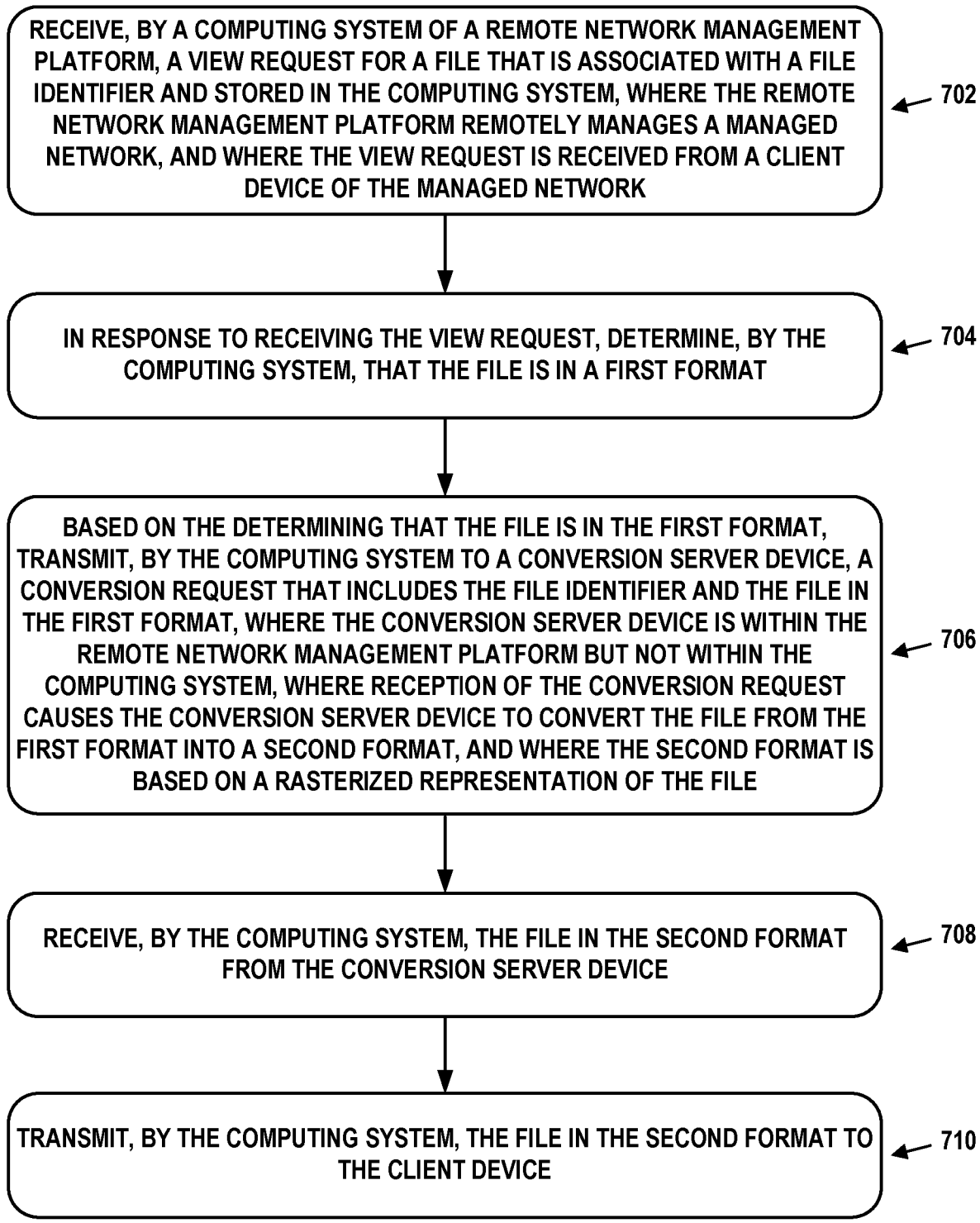
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 702 may involve receiving, by a computing system of a remote network management platform, a view request for a file that is associated with a file identifier and stored in the computing system, where the remote network management platform remotely manages a managed network, and where the view request is received from a client device of the managed network.

Block 704 may involve, in response to receiving the view request, determining, by the computing system, that the file is in a first format.

Block 706 may involve, based on the determining that the file is in the first format, transmitting, by the computing system to a conversion server device, a conversion request that includes the file identifier and the file in the first format, where the conversion server device is within the remote network management platform but not within the computing system, and where reception of the conversion request causes the conversion server device to convert the file from the first format into a second format, and wherein the second format is based on a rasterized representation of the file.

Block 708 may involve receiving, by the computing system, the file in the second format from the conversion server device.

Block 710 may involve transmitting, by the computing system, the file in the second format to the client device.

In some embodiments, after receiving the conversion request from the computing system, the conversion serer device may transmit, to the computing system, a request identifier that refers to the conversion of the file from the first format to the second format.

In some embodiments, after transmitting the request identifier, the conversion serer device may transmit, to the computing system, a conversion complete message indicating that the conversion of the file from the first format to the second format is complete, where the conversion complete message includes the file identifier and the request identifier.

In some embodiments, in response to receiving, from the conversion server device, the conversion complete message including the file identifier, the computing system may transmit, to the conversion server device, a file retrieval request for the file in the second format, where the file retrieval request includes the file identifier and the request identifier.

In some embodiments, the conversion request may include a randomly generated bitstring and the file retrieval request may also include the randomly generated bitstring.

In some embodiments, before transmitting the file in the second format to the computing system, the conversion server device may verify that the randomly generated bitstring included in the file retrieval request is identical to the randomly generated bitstring included in the conversion request. And in response to the verifying, the conversion server device may transmit the file in the second format to the computing system.

In some embodiments, the conversion server device transmitting the file in the second format to the computing system involves the conversion server device transmitting the file in the second format to the computing system further in response to the file retrieval request including the file identifier and the request identifier.

In some embodiments, the view request may include a browser cookie associated with a web browser operated by the client device, the conversion request may include the browser cookie, and the file retrieval request may also include the browser cookie.

In some embodiments, before transmitting the file in the second format to the computing system, the conversion server device may verify that the browser cookie included in the file retrieval request is identical to the browser cookie included in the conversion request. In response to the verifying, the conversion server device may transmit the file in the second format to the computing system.

In some embodiments, the conversion server device transmitting the file in the second format to the computing system involves the conversion server device transmitting the file in the second format to the computing system further in response to the file retrieval request including the file identifier and the request identifier.

In some embodiments, a network system including the computing system and the conversion server device may also include a plurality of conversion server devices and a load balancer. Generally, the conversion server device may be one of the plurality of conversion server devices. Also, the load balancer may be configured to add a conversion server identifier to the conversion complete message before the conversion complete message is received by the computing system, where the conversion server identifier identifies the conversion server device from which to obtain the file in the second format. In such embodiments, the computing system may transmit, by way of the load balancer, a file retrieval request in response to receiving the conversion complete message, where the file retrieval request is for the file in the second format, and where the file retrieval request includes the conversion server identifier. The load balancer may then forward the file retrieval request to the conversion server device based on the file retrieval request including the conversion server identifier.

In some embodiments, after receiving the file in the second format from the conversion server device, the computing system may transmit, to the client device, an availability indication indicating that the file in the second format is available, where the availability indication includes the file identifier.

In some embodiments, after receiving the view request, the computing system may periodically receive, from the client device, a ping message inquiring about availability of the file in the second format. In such embodiments, transmitting the availability indication to the client device may involve transmitting, after the computing system receives the file in the second format from the conversion server device, the availability indication to the client device in response to the ping message.

In some embodiments, in response to transmitting the availability indication including the file identifier, the computing system may receive, from the client device, a receipt request for the file in the second format, where the receipt request includes the file identifier. In such embodiments, transmitting the file in the second format to the client device may involve transmitting the file in the second format to the client device in response to receiving the receipt request including the file identifier.

In some embodiments, transmitting the file in the second format to the client device for display causes the client device to launch an application arranged to display files in the second format.

In some embodiments, the first format is supported by one of a word processing application, a presentation application, or a spreadsheet application, and the second format is a portable document format (PDF).

In some embodiments, the client device may be a first client device and the view request may be a first view request. In such embodiments, after receiving the file in the second format from the conversion server device, the computing system may store, in association with the managed network, the file in the second format. After storing the file in the second format, the computing system may receive, from a second client device of the managed network, a second view request for the file. In response to receiving the second view request, the computing system may make a determination that the file is stored in association with the managed network and that the second client device is of the managed network. In response to making the determination, the computing system may transmit, to the second client device, the stored file in the second file format.

In some embodiments, in response to receiving the view request, the computing system may determine that the client device is permitted to display the file. In such embodiments, transmitting the conversion request may involve transmitting the conversion request further based on the determining that the client device is permitted to display the file.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A network system comprising:
a conversion server device disposed within a remote network management platform; and
a computing system disposed within the remote network management platform, wherein the computing system is configured to:
receive a view request for a file that is associated with a file identifier and stored in the computing system, wherein the view request is received from a client device of a managed network, and wherein the remote network management platform is configured to remotely manage the managed network;
in response to receiving the view request, determine that the file is in a first format;
in response to determining that the file is in the first format, transmit, to the conversion server device, a conversion request that includes the file identifier and the file in the first format, wherein the conversion server device is configured to convert the file from the first format into a second format in response to receiving the conversion request, and wherein the second format is based on a rasterized representation of the file, wherein the conversion request includes a security identifier separate from the file identifier, wherein the security identifier comprises a randomly generated bitstring, and wherein the computing system is configured to transmit to the conversion server device a file retrieval request that includes the security identifier, wherein the conversion server device is configured to:
verify authorization of the computing system via the security identifier, wherein verifying the authorization comprises, before transmitting the file in the second format to the computing system, verifying that the randomly generated bitstring included in the file retrieval request is identical to the randomly generated bitstring included in the conversion request; and
in response to the verifying, transmit the file in the second format to the computing system;
receive the file in the second format from the conversion server device; and
transmit the file in the second format to the client device.

2. The network system of claim 1, wherein the conversion server device is configured to:
after receiving the conversion request from the computing system, transmit, to the computing system, a request identifier that refers to the conversion of the file from the first format to the second format.

3. The network system of claim 2, wherein:
the conversion server device is configured to, after transmitting the request identifier, transmit, to the computing system, a conversion complete message indicating that the conversion of the file from the first format to the second format is complete, and wherein the conversion complete message includes the file identifier and the request identifier; and
the computing system is configured to, in response to receiving, from the conversion server device, the conversion complete message including the file identifier, transmit, to the conversion server device, the file retrieval request for the file in the second format, wherein the file retrieval request includes the file identifier and the request identifier.

4. The network system of claim 1, wherein:
the view request includes a browser cookie associated with a web browser operated by the client device, wherein the conversion request includes the browser cookie, and wherein the file retrieval request, from the computing system to the conversion server device, also includes the browser cookie; and
wherein the conversion server device is configured to:
before transmitting the file in the second format to the computing system, verify that the browser cookie included in the file retrieval request is identical to the browser cookie included in the conversion request; and
in response to the verifying, transmit the file in the second format to the computing system.

5. The network system of claim 1, comprising:
a plurality of conversion server devices, wherein the conversion server device is one of the plurality of conversion server devices; and
a load balancer configured to distribute data traffic across the plurality of conversion server devices, wherein the load balancer is configured to add a conversion server identifier to a conversion complete message before the conversion complete message is received by the computing system, wherein the conversion server identifier identifies the conversion server device from which to obtain the file in the second format,
wherein the computing system is configured to transmit, by way of the load balancer, the file retrieval request in response to receiving the conversion complete message, wherein the file retrieval request is for the file in the second format, wherein the file retrieval request includes the conversion server identifier, and
wherein the load balancer is configured to forward the file retrieval request to the conversion server device based on the file retrieval request including the conversion server identifier.

6. The network system of claim 1, wherein the computing system is configured to, after receiving the file in the second format from the conversion server device, transmit, to the client device, an availability indication indicating that the file in the second format is available, wherein the availability indication includes the file identifier.

7. The network system of claim 1, wherein transmitting the file in the second format to the client device for display causes the client device to launch an application arranged to display files in the second format.

8. The network system of claim 1, wherein the first format is supported by one of a word processing application, a presentation application, or a spreadsheet application, and wherein the second format is a portable document format (PDF).

9. The network system of claim 1, wherein the client device is a first client device, wherein the view request is a first view request, and wherein the computing system is configured to:
after receiving the file in the second format from the conversion server device, store, in association with the managed network, the file in the second format;
after storing the file in the second format, receive, from a second client device of the managed network, a second view request for the file;
in response to receiving the second view request, make a determination that the file is stored in association with the managed network and that the second client device is of the managed network; and in response to making the determination, transmit, to the second client device, the stored file in the second format.

10. The network system of claim 1, wherein the computing system is configured to, in response to receiving the view request, determine that the client device is permitted to display the file, wherein transmitting the conversion request comprises transmitting the conversion request based on the determining that the client device is permitted to display the file.

11. A method comprising:

receiving, by a computing system of a remote network management platform, a view request for a file that is associated with a file identifier and stored in the computing system, wherein the remote network management platform is configured to remotely manage a managed network, and wherein the view request is received from a client device of the managed network;

in response to receiving the view request, determining, by the computing system, that the file is in a first format;

based on the determining that the file is in the first format, transmitting, by the computing system to a conversion server device, a conversion request that includes the file identifier and the file in the first format, wherein the conversion server device is within the remote network management platform but not within the computing system, wherein reception of the conversion request causes the conversion server device to convert the file from the first format into a second format, and wherein the second format is based on a rasterized representation of the file;

receiving, by the computing system, the file in the second format from the conversion server device;

transmitting, by the computing system, the file in the second format to the client device; and maintaining an audit trail associated with the file, wherein maintaining the audit trail comprises:

in response to receiving the view request, updating a view count associated with the file; and in response to receiving a download request for the file, updating a download count associated with the file, wherein the download count keeps track of download requests for the file in each of a plurality of file formats separately.

12. An article of manufacture including a non-transitory computer-readable medium, having stored thereon program instructions that, upon execution by a computing system of a remote network management platform, cause the computing system to perform operations comprising:

receiving a view request for a file that is associated with a file identifier and stored in the computing system, wherein the remote network management platform is configured to remotely manage a managed network, and wherein the view request is received from a client device of the managed network;

in response to receiving the view request, determining that the file is in a first format;

based on the determining that the file is in the first format, transmitting, to a conversion server device, a conversion request that includes the file identifier and the file in the first format, wherein the conversion server device is within the remote network management platform but not within the computing system, and wherein reception of the conversion request causes the conversion server device to convert the file from the first format into a second format, and wherein the second format is based on a rasterized representation of the file;

receiving the file in the second format from the conversion server device;

transmitting the file in the second format to the client device; and maintaining an audit trail associated with the file, wherein maintaining the audit trail comprises:

in response to receiving the view request, updating a view count associated with the file; and in response to receiving a download request for the file, updating a download count associated with the file, wherein the download count keeps track of download requests for the file in each of a plurality of file formats separately.

13. The method of claim 11, comprising:

after receiving, via the computing system, the view request, periodically receiving, from the client device, a ping message inquiring about availability of the file in the second format; and after the computing system receives the file in the second format from the conversion server device, and in response to the ping message, transmitting an availability indication to the client device.

14. The method of claim 11, wherein the conversion request includes a security identifier separate from the file identifier, wherein the security identifier comprises a randomly generated bitstring, the method comprising transmitting, via the computing system, a file retrieval request to the conversion server device, wherein the file retrieval request includes the security identifier.

15. The article of manufacture of claim 12, wherein the operations comprise, in response to receiving the file in the second format from the conversion server device, transmitting, to the client device, an availability indication indicating that the file in the second format is available, wherein the availability indication includes the file identifier.

16. The article of manufacture of claim 12, wherein transmitting the conversion request to the conversion server device comprises transmitting the conversion request to a load balancer, wherein the load balancer is configured transmit the conversion request to the conversion server device of a plurality of conversion server devices.

17. The network system of claim 1, wherein the remote network management platform is configured to maintain an access control list, wherein, in response to receiving the view request from the client device, the computing system is configured to verify that the client device is authorized to view the file, via the access control list.

18. A method comprising:

receiving, by a computing system of a remote network management platform, a view request for a file that is associated with a file identifier and stored in the computing system, wherein the remote network management platform is configured to remotely manage a managed network, and wherein the view request is received from a client device of the managed network;

in response to receiving the view request, determining, by the computing system, that the file is in a first format;

based on the determining that the file is in the first format, transmitting, by the computing system to a conversion server device, a conversion request that includes the file identifier and the file in the first format, wherein the conversion server device is within the remote network management platform but not within the computing system, wherein reception of the conversion request causes the conversion server device to convert the file from the first format into a second format, and wherein the second format is based on a rasterized representation of the file;

after receiving, via the computing system, the view request, periodically receiving, from the client device, a ping message inquiring about availability of the file in the second format;

receiving, by the computing system, the file in the second format from the conversion server device;

after receiving, via the computing system, the file in the second format from the conversion server device, and in response to the ping message, transmitting an availability indication to the client device; and transmitting, by the computing system, the file in the second format to the client device.

19. The network system of claim 1, wherein the remote network management platform comprises an application platform as a service (aPaaS) configured to provide aPaaS services to the managed network.

20. The method of claim 11, wherein the remote network management platform comprises an application platform as a service (aPaaS) configured to provide aPaaS services to the managed network.

21. The article of manufacture of claim 12, wherein the remote network management platform comprises an application platform as a service (aPaaS) configured to provide aPaaS services to the managed network.

* * * * *